US012802974B2

(12) United States Patent
Yoon et al.

(10) Patent No.: US 12,802,974 B2
(45) Date of Patent: Nov. 17, 2026

(54) ULTRATHIN REFERENCE ELECTRODE AND ELECTROCHEMICAL DEVICES INCLUDING THE SAME

(71) Applicant: GM Global Technology Operations LLC, Detroit, MI (US)

(72) Inventors: Insun Yoon, Shelby Township, MI (US); Kyungjae Lee, Rochester Hills, MI (US); Yifan Zhao, Troy, MI (US); Manuela Ferreira Borras, Dearborn, MI (US); Meinan He, Birmingham, MI (US); Fang Dai, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 460 days.

(21) Appl. No.: 18/469,744

(22) Filed: Sep. 19, 2023

(65) Prior Publication Data

US 2025/0096248 A1 Mar. 20, 2025

(51) Int. Cl.

| | |
|---|---|
| ***H01M 4/40*** | (2006.01) |
| ***H01M 4/02*** | (2006.01) |
| ***H01M 4/04*** | (2006.01) |
| ***H01M 4/66*** | (2006.01) |

(52) U.S. Cl.

CPC ......... *H01M 4/405* (2013.01); *H01M 4/0426* (2013.01); *H01M 4/662* (2013.01); *H01M 2004/021* (2013.01); *H01M 2220/20* (2013.01)

(58) Field of Classification Search

CPC .... H01M 4/0426; H01M 4/134; H01M 4/382; H01M 4/405; H01M 4/661; H01M 4/662; H01M 4/667; H01M 10/052; H01M 2004/021; H01M 2004/027; H01M 2220/20; Y02E 60/10

See application file for complete search history.

(56) References Cited

U.S. PATENT DOCUMENTS

| | | | |
|---|---|---|---|
| 8,586,222 B2 | 11/2013 | Timmons et al. |
| 9,419,313 B2 | 8/2016 | Paik et al. |
| 10,439,526 B2 | 10/2019 | Tian |
| 11,658,304 B2 | 5/2023 | Wang et al. |

(Continued)

FOREIGN PATENT DOCUMENTS

| | | | | |
|---|---|---|---|---|
| CN | 116759527 A * | 9/2023 | ............. H01M 4/13 |
| DE | 102014220993 A1 | 4/2015 | |

(Continued)

OTHER PUBLICATIONS

German Application No. 10 2023 131 569.2 filed Nov. 14, 2023; German Office Action dated Jun. 7, 2024; 7 pages.

*Primary Examiner* — Daniel S Gatewood

(74) *Attorney, Agent, or Firm* — CANTOR COLBURN LLP

(57) ABSTRACT

A battery cell, including an anode, a cathode, and a reference electrode, wherein the reference electrode is interposed between the anode and the cathode; wherein the reference electrode includes an active material layer disposed on a current collector; and wherein the active material layer includes lithium, a lithium aluminum alloy, sodium, a sodium potassium alloy, a sodium calcium alloy, a sodium-lithium-magnesium alloy, a sodium-lithium-aluminum alloy, a sodium lead alloy, a sodium silicon alloy, a sodium antimony alloy, or a sodium zinc alloy.

15 Claims, 4 Drawing Sheets

(56) References Cited

U.S. PATENT DOCUMENTS

| | | | | |
|---|---|---|---|---|
| 2014/0375325 | A1 * | 12/2014 | Wang | H01M 4/70 324/426 |
| 2016/0308260 | A1 | 10/2016 | Yu et al. | |
| 2017/0009360 | A1 | 1/2017 | Schuh et al. | |
| 2017/0324119 | A1 | 11/2017 | Powell, Jr. et al. | |
| 2019/0044097 | A1 | 2/2019 | Yu et al. | |
| 2021/0091369 | A1 * | 3/2021 | Dadheech | H01M 10/0525 |
| 2021/0091424 | A1 * | 3/2021 | Gao | H01M 50/417 |
| 2022/0181712 | A1 | 6/2022 | Dadheech et al. | |
| 2022/0352507 | A1 | 11/2022 | Koch et al. | |
| 2023/0091154 | A1 | 3/2023 | Gao et al. | |

FOREIGN PATENT DOCUMENTS

| | | | |
|---|---|---|---|
| DE | 102022106735 | A1 | 11/2022 |
| WO | 2014204479 | A1 | 12/2014 |

* cited by examiner

ULTRATHIN REFERENCE ELECTRODE AND ELECTROCHEMICAL DEVICES INCLUDING THE SAME

INTRODUCTION

The present disclosure relates to thin-film reference electrodes, electrochemical devices including thin-film reference electrodes, and methods of making electrochemical devices.

Secondary, or rechargeable, metal-ion batteries are often used in many stationary and portable devices, such as those encountered in the consumer electronic, automobile/automotive, medical equipment, machinery, robotic, and aerospace industries. Examples of secondary, or rechargeable, metal-ion batteries include lithium-based batteries and sodium-based batteries. In the automotive industry, metal-ion batteries may be suitable for electric-based vehicles, such as hybrid electric vehicles (HEV), battery electric vehicles (BEV), plug-in HEVs, and extended-range electric vehicles (EREV). The lithium class of batteries has gained popularity for various reasons including a relatively high energy density, high power capability, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

Rechargeable metal-ion batteries operate by reversibly passing metal ions back and forth between the negative electrode and the positive electrode. A separator and an electrolyte are disposed between the negative and positive electrodes. The electrolyte is suitable for conducting metal ions and may be in solid (e.g., solid state diffusion) or liquid form. The metal ions move from a cathode (positive electrode) to an anode (negative electrode) during charging of the battery, and in the opposite direction when discharging the battery.

It may be desirable to perform electrochemical analysis on batteries or certain components of the batteries during cycling. In many instances, reference electrodes enable monitoring of individual potentials during cycling without interfering with battery operation. Common reference electrodes include one or more gold layers (e.g., current collector layers) disposed, for example using a sputtering process, on one or more surfaces of a porous separator substrate. The current collector layers are often non-porous, but permeable gold films. Such reference electrodes are often expensive and require complex manufacturing processes. Accordingly, it would be desirable to develop improved reference electrode materials and structures, and methods for making the same, that can address these and other challenges.

SUMMARY

An aspect provides a battery cell including an anode, a cathode, and a reference electrode, wherein the reference electrode is interposed between the anode and the cathode. The reference electrode includes an active material layer that is disposed on a current collector. The active material layer includes lithium, a lithium aluminum alloy, sodium, a sodium potassium alloy, a sodium calcium alloy, a sodium-lithium-magnesium alloy, a sodium-lithium-aluminum alloy, a sodium lead alloy, a sodium silicon alloy, a sodium antimony alloy, or a sodium zinc alloy.

In another embodiment, the battery cell further includes a first separator that is interposed between the anode and the reference electrode, and a second separator that is interposed between the cathode and the reference electrode.

In another embodiment, the current collector includes copper, nickel, titanium, platinum, gold, silver, magnesium, aluminum, vanadium, an alloy thereof, or a combination thereof.

In another embodiment, the active material layer has a thickness of 10 nanometers to 3000 nanometers.

In another embodiment, the current collector has a thickness of 10 nanometers to 1000 nanometers.

In another embodiment, the active material layer is derived from in-situ lithium plating of the current collector.

In another embodiment, the active material layer is deposited on the current collector before assembly of the battery cell.

In another embodiment, the active material layer includes lithium.

In another embodiment, the anode includes at least one of silicon, silicon mixed with graphite, soft carbon, hard carbon, a silicon oxide ($SiO_x$, $0<x<2$), tin, tin dioxide, or titanium dioxide.

Another aspect provides a method of forming a battery cell including an anode, a cathode, and a reference electrode. The reference electrode is interposed between the anode and the cathode. The reference electrode includes an active material layer disposed on a current collector. The active material layer includes lithium, a lithium aluminum alloy, sodium, a sodium potassium alloy, a sodium calcium alloy, a sodium-lithium-magnesium alloy, a sodium-lithium-aluminum alloy, a sodium lead alloy, a sodium silicon alloy, a sodium antimony alloy, or a sodium zinc alloy. The method includes forming the active material layer on the current collector.

In another embodiment, the forming includes sputter deposition, thermal evaporation, or e-beam evaporation.

In another embodiment, the forming includes forming a layer of a lithium aluminum alloy.

In another embodiment, the forming includes potentiostatic lithiation, galvanostatic lithiation, or electrical shorting of the current collector.

In another embodiment, the current collector includes copper, nickel, titanium, platinum, gold, silver, magnesium, aluminum, vanadium, an alloy thereof, or a combination thereof.

In another embodiment, the active material layer has a thickness of 10 nanometers to 3000 nanometers.

In another embodiment, the current collector has a thickness of 10 nanometers to 1000 nanometers.

In another embodiment, the anode includes at least one of silicon, silicon mixed with graphite, soft carbon, hard carbon, a silicon oxide ($SiO_x$, $0<x<2$), tin, tin dioxide, or titanium dioxide.

In another embodiment, the current collector includes aluminum, and the forming includes in-situ lithiation to provide an active material layer including a lithium aluminum alloy.

In another embodiment, the current collector includes copper or nickel, and the forming includes in-situ lithium plating to provide an active material layer including lithium.

In another embodiment, the forming includes in-situ formation of an active material layer including sodium.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
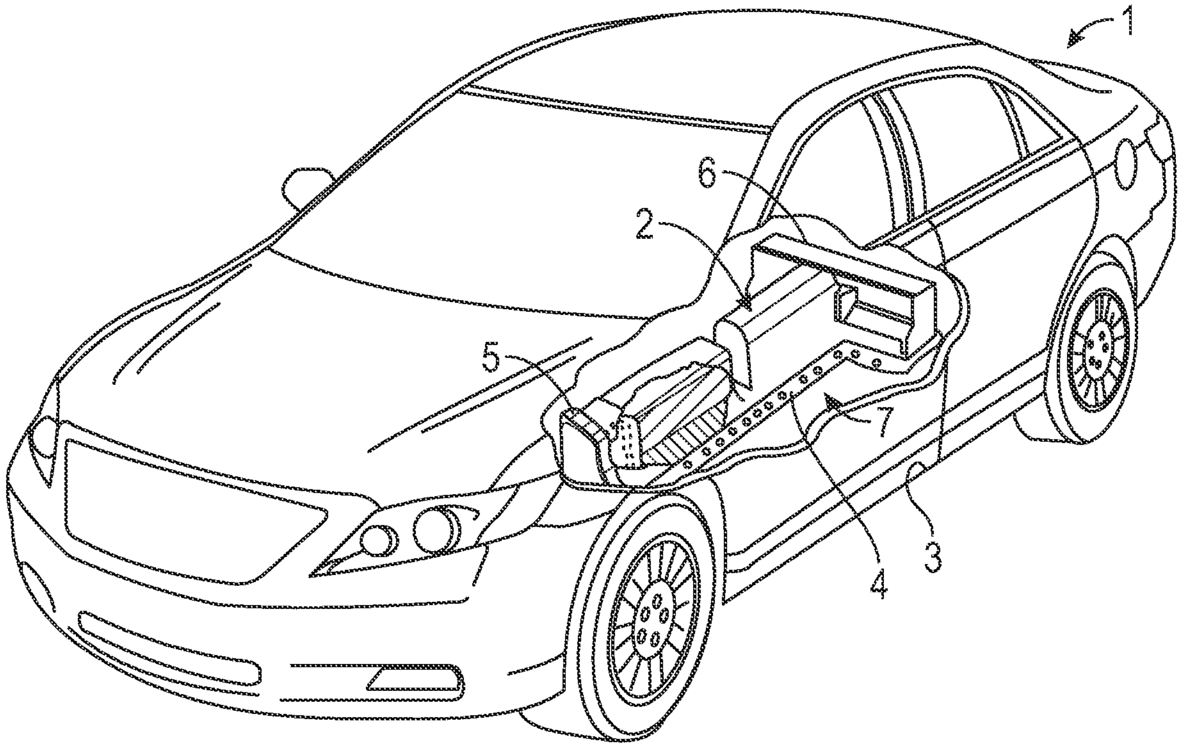
FIG. 1 is a schematic, perspective view of an electric vehicle with a cut-away section to reveal a battery pack assembly in accordance with one or more embodiments.

The following description is merely exemplary in nature and is not intended to limit the present disclosure, its application, or uses. It should be understood that throughout the drawings, corresponding reference numerals indicate like or corresponding parts and features. As used herein, the terms “anode” and “negative electrode” are used interchangeably, and the terms “cathode” and “positive electrode” are used interchangeably.

The present technology pertains to improved electrochemical cells (e.g., battery cells), especially lithium-ion, or more particularly lithium-metal batteries, which may be used in vehicle applications. However, the present technology may also be used in other electrochemical devices, such as sodium ion batteries, so that the discussion of a lithium-ion battery herein is non-limiting.

Referring now to FIG. 1, an electric vehicle 1 having a high voltage battery pack assembly 7 provided with a battery module 2 is shown. The exemplary battery module 2 includes a plurality of electrochemical battery cells, for example metal ion batteries. Further, the battery pack assembly 7 may include a plurality of battery modules 2. The exemplary electric vehicle 1 includes a vehicle chassis 3 and a battery tray 4. In the illustrated embodiment, the battery module 2 attaches to a battery tray 4. Further, the battery tray 4 attaches to the vehicle chassis 3 to secure the battery pack assembly 7 to the electric vehicle 1.

The exemplary electric vehicle 1 may also include a battery disconnect unit (BDU) 5, which is connected to the battery pack assembly 7 and provides electrical communication between the battery pack assembly 7 and an electrical system (not shown) of the electric vehicle 1. The exemplary electric vehicle 1 may further include a battery cover 6 that extends around the battery module 2. The exemplary battery cover 6 may protect the battery module 2 from being damaged, as well as provide electrical insulation from the high voltage of the battery pack assembly 7. The battery pack assembly 7 shown in FIG. 1 includes the battery module 2, the battery tray 4, the BDU 5, and the battery cover 6; whereas the vehicle chassis 3 is not included as an element of the battery pack assembly 7.

In accordance with an exemplary embodiment, provided is an electrochemical battery cell including an anode, a cathode, and a reference electrode, wherein the reference electrode is interposed between the anode and the cathode. The reference electrode includes an active material layer disposed on a current collector; and the active material layer includes lithium, a lithium aluminum alloy, sodium, a sodium potassium alloy, a sodium calcium alloy, a sodium-lithium-magnesium alloy, a sodium-lithium-aluminum alloy, a sodium lead alloy, a sodium silicon alloy, a sodium antimony alloy, or a sodium zinc alloy. In some embodiments, the active material layer includes lithium or a lithium aluminum alloy.

Figure 2:
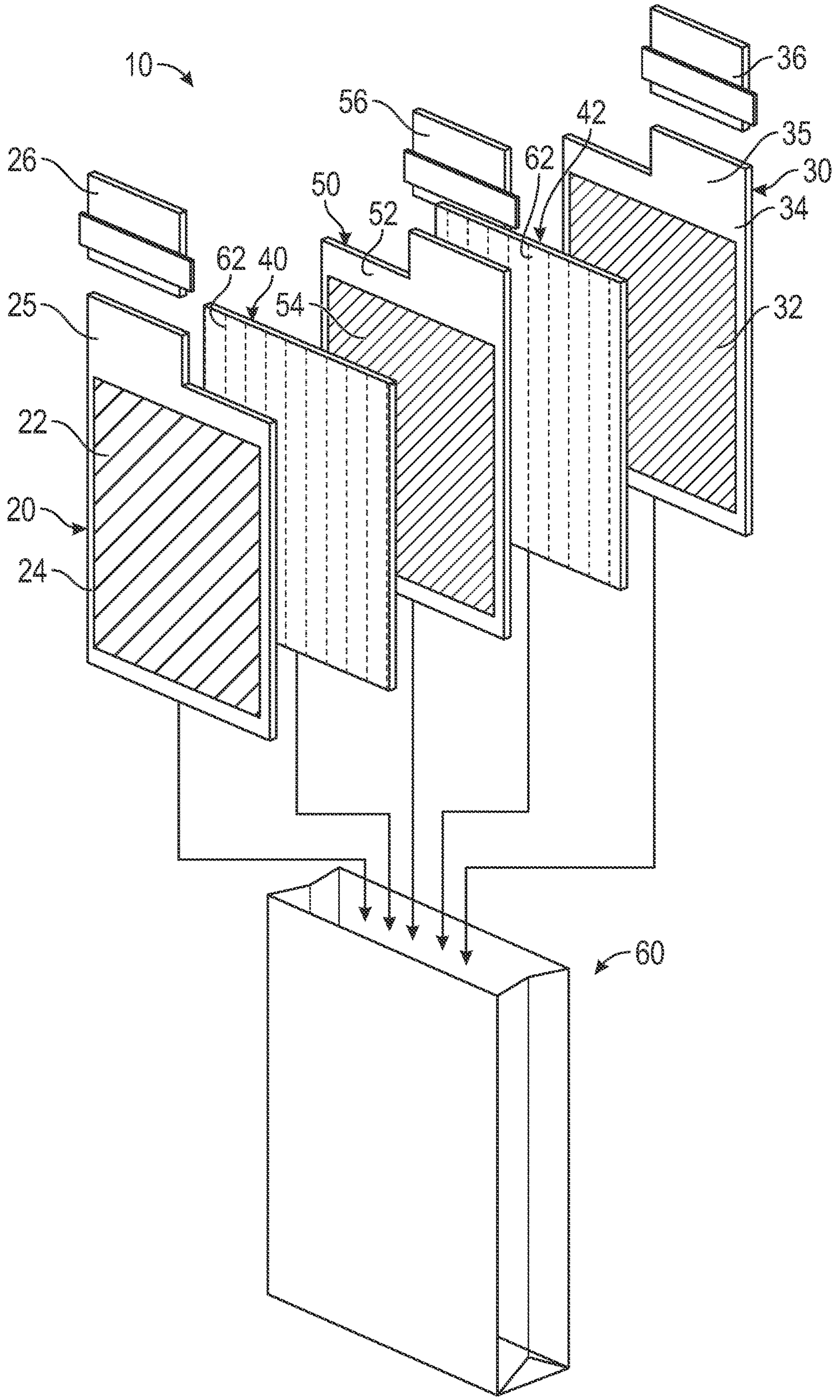
FIG. 2 schematically shows a disassembled isometric view of a battery cell according to one or more embodiments.

FIG. 2 schematically illustrates an embodiment of battery cell 10 that includes an anode 20, a first separator 40, a reference electrode 50, a second separator 42, and a cathode 30 that are arranged in a stack and sealed in a flexible pouch 60 containing an electrolytic material 62 (electrolyte). A first, negative battery cell tab 26 and a second, positive battery cell tab 36 protrude from the flexible pouch 60. A single arrangement of the anode 20, first separator 40, reference electrode 50, second separator 42, and cathode 30 is illustrated. It is appreciated that different configurations of the anode 20, first separator 40, reference electrode 50, second separator 42, and cathode 30 may be used and electrically connected in the flexible pouch 60, depending upon the specific application of the battery cell 10.

The battery cell 10 can generate an electric current during discharge by way of reversible electrochemical reactions that occur when an external circuit is closed (to connect the anode 20 and the cathode 30) when the anode 20 contains a relatively greater quantity of lithium (or sodium). The chemical potential difference between the cathode 30 and the anode 20 drives electrons produced at the anode 20 through the external circuit toward the cathode 30. Lithium ions (or sodium ions), which are also produced at the cathode 30, are concurrently transferred through the electrolyte 60 and separator 42 towards the cathode 30. The electrons flow through the external circuit and the lithium ions (or sodium ions) migrate across the separator 42 in the electrolyte 60 to the cathode 30, where they may be plated, reacted, or intercalated. The electric current passing through the external circuit can be harnessed and directed through a load device until the lithium (or sodium) in the anode 20 is depleted and the capacity of the battery cell 10 is diminished. While in lithium-ion batteries, lithium intercalates and/or alloys in the electrode active materials, in a lithium sulfur battery, instead of intercalating or alloying, the lithium dissolves from the negative electrode and migrates to the positive electrode where it reacts/plates during discharge, while during charging, lithium plates on the negative electrode.

The battery cell 10 can be charged or re-energized by connecting an external power source to the battery cell 10 to reverse the electrochemical reactions that occur during battery discharge. The connection of an external power source to the battery cell 10 compels the production of electrons and release of lithium ions (or sodium ions) from the cathode 30. The electrons, which flow back towards the anode 20 through the external circuit, and the lithium ions (or sodium ions), which are carried by the electrolyte 60 across the separator 42 back towards the anode 20, reunite at the anode 20 and replenish it with lithium (or sodium) for consumption during the next battery discharge cycle. As such, each discharge and charge event is considered to be a cycle, where lithium ions (or sodium ions) are cycled between the cathode 30 and the anode 20.

Furthermore, the battery cell 10 can include a variety of other components that, while not depicted here for the sake of convenience, are nonetheless known to those of skill in the art and may be included in the battery cell 10. For example, the battery cell 10 may include a casing, gaskets, terminal caps, tabs, battery terminals, and/or any other conventional components or materials, including between or around the anode 20, the cathode 30, and/or the separators 40, 42, by way of non-limiting examples. As noted above, the size and shape of the battery cell 10 may vary depending on the particular application for which it is designed. The battery cell 10 may also be connected in series or parallel with other similar cells or batteries to produce a greater voltage output, energy, and/or power if it is required by the load device.

The anode 20 includes an anode active material 22 that is arranged on an anode current collector 24. In some embodiments, as shown in FIG. 2, the anode current collector 24 may have a foil portion 25 that extends from the anode active material 22 to form the first battery cell tab 26.

The anode current collector 24 may include a metal including copper, nickel, or an alloy thereof, stainless steel, or other appropriate electrically conductive materials. The anode current collector 24 may be in the form of a foil, slit mesh, and/or woven mesh. In an embodiment, the anode current collector includes copper.

The anode active material 22 may be a lithium host material. Common negative electroactive materials include lithium insertion materials or alloy host materials. Such materials can include carbon-containing materials, such as lithium-graphite intercalation compounds, lithium-silicon compounds, lithium-tin alloys, or lithium titanate $Li_{4+x}Ti_5O_{12}$, where $0 \leq x \leq 3$, such as $Li_4Ti_5O_{12}$ (LTO). For example, the anode active material 22 may include at least one of silicon, silicon mixed with graphite, soft carbon, hard carbon, a silicon oxide ($SiO_x$, $0<x<2$), tin, tin dioxide, titanium dioxide, or a combination thereof. The lithium host material may be intermingled with a polymeric binder material to provide structural integrity and, in some aspects, a conductive fine particle diluent. For example, the lithium host material may be graphite and the polymeric binder material may be one or more of polyvinylidene fluoride (PVdF), an ethylene propylene diene monomer (EPDM) rubber, styrene butadiene rubber (SBR), a carboxymethyl cellulose (CMC), polyacrylic acid, or a combination thereof. Graphite exhibits favorable lithium intercalation and deintercalation characteristics that help provide the anode 20 with a desired energy density. Various forms of graphite are commercially available. The conductive diluent may be fine particles of, for example, high-surface area carbon black. For sodium batteries, an appropriate anode active material 22 is a sodium host material.

In some embodiments, the anode 20 may optionally include one or more of graphite, activated carbon, carbon black, hard carbon, soft carbon, graphene, silicon, tin oxide, aluminum, indium, zinc, germanium, silicon oxide, titanium oxide, lithium titanate, or a combination thereof. Non-limiting examples of silicon-containing electroactive materials include silicon (amorphous or crystalline), or silicon containing binary and/or ternary alloys, such as SiSn, SiSnFe, SiSnAl, SiFeCo, or the like, or a combination thereof. For example, the anode may include at least one of silicon, silicon mixed with graphite, soft carbon, hard carbon, a silicon oxide ($SiO_x$, $0<x<2$), tin, tin dioxide, or titanium dioxide.

In still other embodiments, the anode 20 may be a lithium metal electrode (LME). Metallic lithium for use in the negative electrode of a rechargeable battery has various potential advantages, including having the highest theoretical capacity and lowest electrochemical potential. Thus, batteries incorporating lithium-metal anodes can have a higher energy density that can potentially double storage capacity, so that the battery may be half the size, but still last the same amount of time as other lithium-ion batteries.

The cathode 30 includes a cathode active material 32 that is arranged on a cathode current collector 34. In some embodiments, as shown in FIG. 2, the cathode current collector 34 may have a foil portion 35 that extends from the cathode active material 32 to form the second battery cell tab 36.

The cathode current collector 34 may be formed from aluminum, an aluminum alloy, or any other appropriate electrically conductive material. The cathode current collector 34 may be in the form of a foil, slit mesh, and/or woven mesh. In an embodiment, the cathode current collector includes aluminum.

When the battery cell 10 is a lithium ion cell, the cathode active material 32 may include a lithium-containing active material, such as a layered lithium transitional metal oxide. Exemplary lithium-containing active materials include spinel lithium manganese oxide ($LiMn_2O_4$), lithium cobalt oxide ($LiCoO_2$), a nickel-manganese oxide spinel ($Li(Ni_{0.5}Mn_{1.5})O_2$), a layered nickel-manganese-cobalt oxide (having a general formula of $xLi_2MnO_3$ (1-x)$LiMO_2$, where M is composed of any ratio of Ni, Mn, and/or Co). A specific example of the layered nickel-manganese oxide spinel is $xLi_2MnO_3(1\text{-}x)Li(Ni_{1/3}Mn_{1/3}CO_{1/3})O_2$. Other exemplary lithium-containing cathode active materials include $Li(Ni_{1/3}Mn_{1/3}Co_{1/3})O_2)$, $LiNiO_2$, $Li_x$+y$Mn_2$-y$O_4$ (LMO, $0<x<1$ and $0<y<0.1$), a lithium iron polyanion oxide, such as lithium iron phosphate ($LiFePO_4$) or lithium iron fluorophosphate ($Li_2FePO_4F$, LFP), or a combination thereof. Other lithium-containing cathode active materials may also be used, such as $LiNi_xM_{1-x}O_2$ (M is composed of any ratio of Al, Co, and/or Mg), $LiNi_{1-x}Co_{1-y}M_{x+y}O_2$ or $LiMn_{1.5-x}Ni_{0.5-y}M_{x+y}O_4$ (M is composed of any ratio of Al, Ti, Cr, and/or Mg), stabilized lithium manganese oxide spinel ($Li_xMn_{2-y}M_yO_4$, where M is composed of any ratio of Al, Ti, Cr, and/or Mg), lithium nickel cobalt aluminum oxide (e.g., $LiNi_{0.8}Co_{0.15}Al_{0.05}O_2$ or NCA), aluminum stabilized lithium manganese oxide spinel ($LixMn_{2-x}Al_yO_4$), lithium vanadium oxide ($LiV_2O_5$), $Li_2MSiO_4$ (M is composed of any ratio of Co, Fe, and/or Mn), a high efficiency nickel-manganese-cobalt material (HE-NMC, NMC or $LiNiMnCoO_2$), or the like, or a combination thereof. By "any ratio" it is meant that any element may be present in any amount. In another example, anion substitutions may be made in the lattice of any example of the lithium transition metal active material to stabilize the crystal structure. For example, any 0 atom may be substituted with an F atom.

When the battery cell 10 is a sodium-ion cell, the cathode active material may include a sodium-containing active material. Examples of suitable sodium-containing active materials include, but are not limited to, sodium manganese hexacyano manganate ($Na_2Mn[Mn(CN)_6]$), $NaVPO_4F$, $NaMnO_2$, $NaFePO_4$, $Na_3V_2(PO_4)_3$), or the like, or a combination thereof.

The cathode active material may be intermingled with a binder and/or a conductive filler. Suitable binders include polyvinylidene fluoride (PVdF), polyethylene oxide (PEO), an ethylene propylene diene monomer (EPDM) rubber, carboxymethyl cellulose (CMC)), styrene-butadiene rubber (SBR), styrene-butadiene rubber carboxymethyl cellulose (SBR-CMC), polyacrylic acid (PAA), cross-linked polyacrylic acid-polyethylenimine, polyimide, polyvinyl alcohol (PVA), sodium alginate, a combination thereof, or other suitable binders. An example of the conductive filler is a high surface area carbon, such as acetylene black, or the like.

The binder may hold the electrode materials together, and the conductive filler may ensure good electron conduction between the positive-side current collector and the active material particles of the cathode.

In various aspects, the negative and positive electrodes 20, 30 may be fabricated by mixing the respective electroactive material into a slurry with a polymeric binder compound, a non-aqueous solvent, optionally a plasticizer, and optionally if necessary, electrically conductive particles. The slurry can be mixed or agitated, and then thinly applied to a substrate via a doctor blade and/or slot die coating. The substrate can be a removable substrate or alternatively a functional substrate, such as a current collector (such as a metallic grid or mesh layer) attached to one side of the electrode film. In one variation, heat or radiation can be applied to evaporate the solvent from the electrode film, leaving a solid residue. The electrode film may be further consolidated, where heat and pressure are applied to the film to sinter and calender it. In other variations, the film may be dried at moderate temperature to form self-supporting films. If the substrate is removable, then it is removed from the electrode film that is then further laminated to a current collector. With either type of substrate, the remaining plasticizer may be extracted prior to incorporation into the battery cell. In various aspects, a solid electrode may be formed according to alternative fabrication methods.

The reference electrode 50 is interposed between the anode 20 and the cathode 30. The reference electrode 50 includes an active material layer 54 that is disposed on a current collector 52. The reference electrode 50 includes an ultrathin current collector 52 that is coated on one side with an active material layer 54. The reference electrode 50 provides a fixed and unchanging electrochemical potential relative to other electrodes in the cell.

The current collector 52 of the reference electrode 50 may be any suitable electrically conductive material. For example, current collector may include copper, nickel, titanium, platinum, gold, silver, magnesium, aluminum, vanadium, an alloy thereof, or a combination thereof.

The current collector 52 may have a thickness of 10 nanometers (nm) to 1000 nm. For example, the current collector 52 may have a thickness of 10 nm to 500 nm, or 50 nm to 400 nm, or 100 nm to 400 nm, but embodiments are not limited thereto.

The current collector 52 can be manufactured using any suitable method. For example, the current collector 52 may be prepared by sputtering an appropriate material onto a substrate, such as a separator material as described herein. In some embodiments, the current collector 52 may be prepared by sputter deposition, thermal evaporation, or e-beam evaporation. In one embodiment, the current collector 52 may be prepared by roll-to-roll sputtering, such as roll-to-roll sputtering of aluminum to form an aluminum current collector.

The active material layer 54 includes lithium, a lithium aluminum alloy, sodium, a sodium potassium alloy, a sodium calcium alloy, a sodium-lithium-magnesium alloy, a sodium-lithium-aluminum alloy, a sodium lead alloy, a sodium silicon alloy, a sodium antimony alloy, or a sodium zinc alloy. Additionally, the porous active material layer 54 may contain a conductive carbon diluent and a polymeric binder. An independent electrical path through the cell pouch to the reference electrode may be provided in the form of the reference electrode tab 56.

The active material layer 54 may have a thickness of 10 nm to 3000 nm. For example, the active material layer may have a thickness of 10 nm to 2000 nm, or 50 nm to 1000 nm, or 100 nm to 500 nm, but embodiments are not limited thereto.

The active material layer 54 may be manufactured using any suitable method. In some embodiments, the active material layer 54 may be derived from in-situ lithiation and/or lithium plating of the current collector 52 and/or a material disposed on the current collector. For example, the in-situ lithiation and/or lithium plating may be accomplished by potentiostatic lithiation, galvanostatic lithiation, or electrical shorting of the current collector and/or a material disposed on the current collector. For example, an aluminum current collector 52 may be processed by potentiostatic lithiation, galvanostatic lithiation, or electrical shorting to provide an active material layer 54 including a lithium aluminum alloy. For example, a copper current collector having disposed thereon a layer of aluminum may be processed by potentiostatic lithiation, galvanostatic lithiation, or electrical shorting to provide an active material layer including a lithium aluminum alloy. For example, a copper current collector may be processed by electrical shorting to provide an active material layer including lithium.

In the case of sodium ions, the active material layer 54 may be derived from in-situ derived sodium ions using appropriate methods. For example, a current collector and/or a layer deposited on the current collector may be derived from potassium, calcium, a lithium magnesium alloy, a lithium aluminum alloy, lead, silicon, antimony, zinc, or a combination thereof. Accordingly, an active material layer 54 may be prepared from in-situ derived sodium ions to provide a sodium potassium alloy, a sodium calcium alloy, a sodium-lithium-magnesium alloy, a sodium-lithium-aluminum alloy, a sodium lead alloy, a sodium silicon alloy, a sodium antimony alloy, a sodium zinc alloy, or a combination thereof as the active material of the reference electrode. In some embodiments, the active material layer 54 includes sodium.

In other embodiments, the active material layer 54 may be prepared before the battery cell 10 is assembled. For example, a layer of a lithium aluminum alloy may be sputtered on a current collector, such as by roll-to-roll sputtering to form the active material layer 54. In some embodiments, the active material layer 54 may be prepared by sputter deposition, thermal evaporation, or e-beam evaporation, for example, by using these methods to apply a layer of a lithium aluminum alloy to the current collector 52. In other embodiments, an active material layer including sodium, a sodium potassium alloy, a sodium calcium alloy, a sodium-lithium-magnesium alloy, a sodium-lithium-aluminum alloy, a sodium lead alloy, a sodium silicon alloy, a sodium antimony alloy, a sodium zinc alloy, or a combination thereof may be prepared before the battery cell is assembled.

The first separator 40 is arranged between the cathode 30 and the reference electrode 50 to physically separate and electrically isolate the cathode 30 from the reference electrode 50. The second separator 42 is arranged between the anode 20 and the reference electrode 50 to physically separate and electrically isolate the anode 20 from the reference electrode 50.

In one embodiment, the first separator 40, the reference electrode 50, and the second separator 42 are fabricated as a single, unitary element 58 that can be interposed between the anode 20 and the cathode 30, thus simplifying the assembly and improving the manufacturability of the battery cell 10.

The first and second separators 40, 42 may each be composed as one or more porous polymer layers that, individually, may be composed of any of a wide variety of polymers. Only one such polymer layer is shown here for simplicity. Each of the one or more polymer layers may be a polyolefin. Some specific examples of a polyolefin are polyethylene (PE) (along with variations such as HDPE, LDPE, LLDPE, and UHMWPE), polypropylene (PP), or a blend of PE and PP. Commercially available polyolefin porous separator membranes include CELGARD® 2500 (a monolayer polypropylene separator) and CELGARD® 2340 (a trilayer polypropylene/polyethylene/polypropylene separator) available from Celgard LLC. The separators may also include other polymers alternatively or in addition to the polyolefin such as, but not limited to, polyethylene terephthalate (PET), polyvinylidene fluoride (PVdF), polyamide (nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polymethylpentene, polyolefin copolymers, acrylonitrile-butadiene styrene copolymers (ABS), polystyrene copolymers, polymethylmethacrylate (PMMA), polysiloxane polymers (e.g., polydimethylsiloxane (PDMS)), polybenzimidazole (PBI), polybenzoxazole (PBO), polyphenylenes, polyarylene ether ketones, polyperfluorocyclobutanes, polyvinylidene fluoride copolymers (e.g., PVdF-hexafluoropropylene or (PVdF-HFP)), or polyvinylidene fluoride terpolymers, polyvinylfluoride, liquid crystalline polymers (e.g., VECTRAN™ (Hoechst AG, Germany) or ZENITE® (DuPont, Wilmington, Del.)), polyaramides, polyphenylene oxide, cellulosic materials, meso-porous silica, or a combination thereof. The separators function to electrically insulate and physically separate the negative and positive electrodes 20, 30 from the reference electrode 50. The first and second separators 40, 42 may further be infiltrated with a liquid electrolyte throughout the porosity of the polymer layer(s). In some embodiments, the separators 40, 42 may also be mixed with a ceramic material or their surfaces may be coated in a ceramic material. For example, a ceramic coating may include alumina ($Al_2O_3$), silicon dioxide ($SiO_2$), titania ($TiO_2$), or the like, or a combination thereof.

The electrolytic (electrolyte) material 62 that conducts lithium ions (or sodium ions) is contained within the separator 40 and is exposed to each of the cathode and anode 30, 20 to permit lithium ions (or sodium ions) to move between the cathode and anode 30, 20. Lithium ions (or sodium ions) de-intercalated from the anode 20 during discharge or from the cathode 30 during charge give up electrons that flow through the current collectors 24 and 34, respectively, through an external circuit connected either to a load or a charger, and then to the opposite current collectors (34 and 24) and electrodes (30 and 20) where they reduce lithium ions (or sodium ions) to lithium metal (or sodium ions) as they are being intercalated.

For a lithium ion battery cell 10, any appropriate electrolyte solution that can conduct lithium ions between the anode 20 and the cathode 30 may be used. In one example, the electrolyte solution may be a non-aqueous liquid electrolyte solution that includes a lithium salt dissolved in an organic solvent or a mixture of organic solvents. Non-limiting examples of lithium salts include lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium difluorooxalatoborate ($LiBF_2(C_2O_4)$) (LiODFB), lithium tetraphenylborate ($LiB(C_6H_5)_4$); lithium bis-(oxalate)borate ($LiB(C_2O_4)_2$) (LiBOB); lithium tetrafluorooxalatophosphate ($LiPF_4(C_2O_4)$) (LiFOP), lithium nitrate ($LiNO_3$), lithium hexafluoroarsenate ($LiAsF_6$); lithium trifluoromethanesulfonate ($LiCF_3SO_3$); lithium bis(trifluoromethanesulfonimide) (LITFSI) ($LiN(CF_3SO_2)_2$); lithium fluorosulfonylimide ($LiN(FSO_2)_2$) (LIFSI); or a combination thereof. In the case of sodium ion batteries, appropriate sodium salts may be selected.

These and other similar lithium salts may be dissolved in a variety of organic solvents, such as cyclic carbonates ethylene carbonate (EC), propylene carbonate (PC), butylene carbonate (BC), and/or fluoroethylene carbonate (FEC), linear carbonates (dimethyl carbonate (DMC), diethyl carbonate (DEC), and/or ethylmethyl carbonate (EMC)), aliphatic carboxylic esters (methyl formate, methyl acetate, and/or methyl propionate), γ-lactones (γ-butyrolactone, and/or γ-valerolactone), chain structure ethers (1,2-dimethoxyethane, 1-2-diethoxyethane, ethoxymethoxyethane, and/or tetraglyme), cyclic ethers (tetrahydrofuran, 2-methyltetrahydrofuran, and/or 1,3-dioxolane), or a combination thereof. In various aspects, the electrolyte may include greater than or equal to 0.5 M to less than or equal to 4.0 M of the one or more lithium salts, for example, about 1 M, about 1 M to 2 M, or about 3 M to about 4 M.

For the sodium-based battery cell 10, any appropriate electrolyte solution that can conduct sodium ions between the anode 20 and the cathode 30 may be used. In one example, the electrolyte solution may be $NaPF_6$ dissolved into the EC and/or DEC, but embodiments are not limited thereto.

In addition to the electrolyte salt(s) and non-aqueous solvent(s), other additives may be included in the electrolyte solution. For example, it may be desired to add one or more of vinylene carbonate (VC), fluoroethylene carbonate (FEC), or lithium bis(oxolato) borate (LiBOB) to enhance the formation of the solid electrolyte interface on the graphite particles of the anode. It may be desired to add N, N-diethylamino trimethyl silane as a cathode protection agent. Tris (2,2,2-trifluoroethyl) phosphate may be added as stabilizer for $LiPF_6$ electrolyte salt. Further, a suitable additive as a safety protection agent and/or as a lithium deposition improver may be added.

In some embodiments, the electrolyte may be a solid-state electrolyte. The solid-state electrolyte may include one or more solid-state electrolyte particles that may include one or more polymer-containing particles, oxide-containing particles, sulfide-containing particles, halide-containing particles, borate-containing particles, nitride-containing particles, hydride-containing particles, or a combination thereof. Exemplary solid-state electrolytes include, but are not limited to, $LiTi_2(PO_4)_3$, $LiGe_2(PO_4)_3$, $Li_7La_3Zr_2O_{12}$, $Li_3xLa_{2/3-x}TiO_3$, $Li_3PO_4$, $Li_3N$, $Li_4GeS_4$, $Li_{10}GeP_2S_{12}$, $Li_2S—P_2S_5$, $Li_6PS_5Cl$, $Li_6PS_5Br$, $Li_6PS_5I$, $Li_3OCl$, $Li_{2.99}Ba_{0.005}ClO$, or a combination thereof.

The discharge capacity C (measured in amp-hour, or Ah) of a lithium ion (or sodium ion) battery can be evaluated at various currents or, more commonly, at various C rates. The C rate is conventionally used to describe battery loads or battery charging in terms of time to charge or discharge C amp-hour. The C rate has the units of amp (or ampere), A, and is capacity C divided by time in hours. A C rate of 1 C means 1 hour to discharge C amp-hour. Other C rates can be employed to evaluate discharge capacity, such as C/2 (2 hours of discharge), C/6 (6 hours of discharge), C/10 (10 hours of discharge), or the like.

It may be desirable to perform electrochemical analysis on electrodes of an electrochemical cell. Electrochemical analysis may produce calibrations for control systems in HEVs and EVs pertaining to fast charge, lithium plating, state of charge, and power estimation, for example. The electrodes may be analyzed by using the reference electrode provided herein. The reference electrode enables monitoring of individual positive and negative electrode potentials as the cell is being cycled. Potentials may be monitored in a lab setting or during real-time use of a system including the electrochemical cell. For example, potentials may be detected during operation of a vehicle, as part of regular vehicle diagnostics. Detected potentials can be used in vehicle control algorithms to improve cell performance, such as by raising anode potential to decrease lithium plating.

In various aspects, the present disclosure provides reference electrode assemblies and three-electrode cells including reference electrode assemblies. The separator layers between the anode, cathode, and the reference electrode layer are all porous such that ions can pass through during cycling of an electrochemical cell including the reference electrode assembly. Therefore, the reference electrode assembly does not interfere with operation of the electrochemical cell. Accordingly, the reference electrode assembly facilitates substantially uniform current distribution.

EXAMPLES

Example 1

An experiment was performed to demonstrate the in-situ formation of a lithium aluminum alloy active material layer on an aluminum reference electrode. A three-electrode coin cell structure was prepared using a lithium anode, a high Ni NCM cathode, a reference electrode, and an electrolyte system including $LiPF_6$, FEC, and DMC. The reference electrode was prepared in-situ by lithiating an aluminum current collector of the reference electrode by linear sweep voltammetry (LSV) to 0.1 Volts (V) versus Li.

Figure 3:
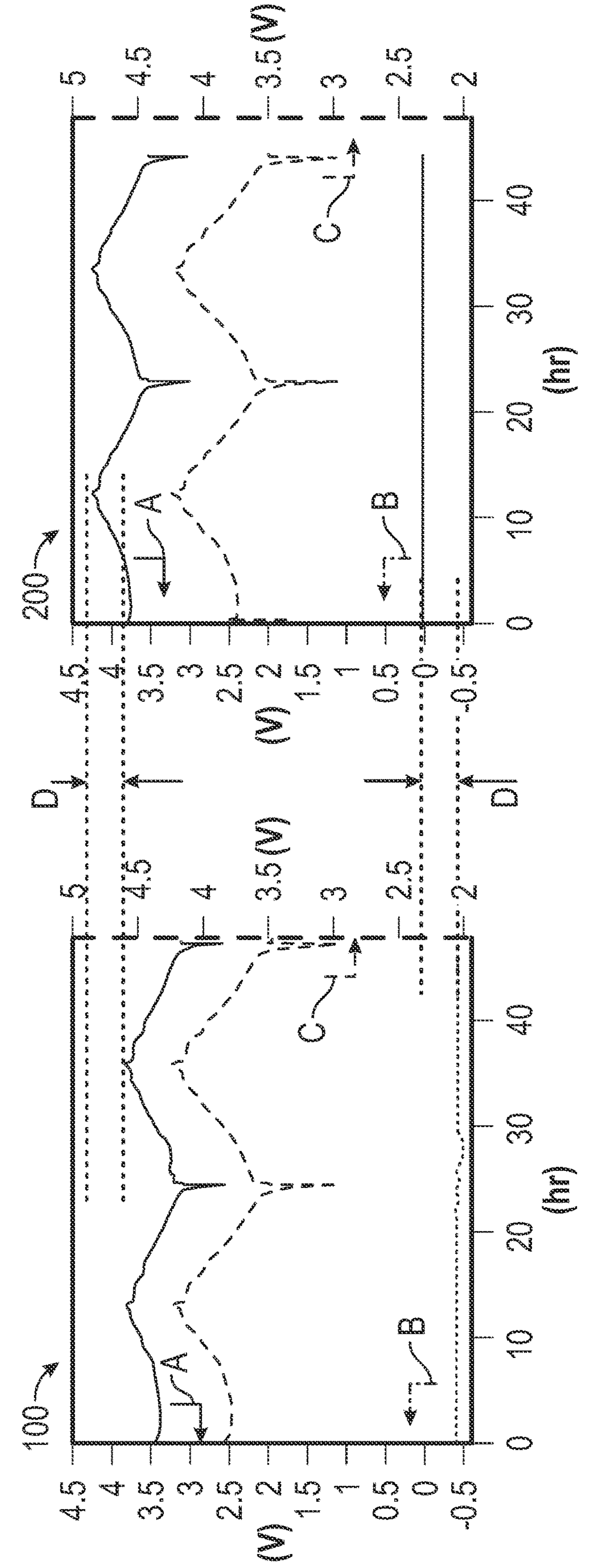
FIG. 3 illustrates graphs of potential (Volts, V) versus time (hours, hr) for a lithium aluminum reference electrode and a lithium reference electrode, respectively.
Figure 4:
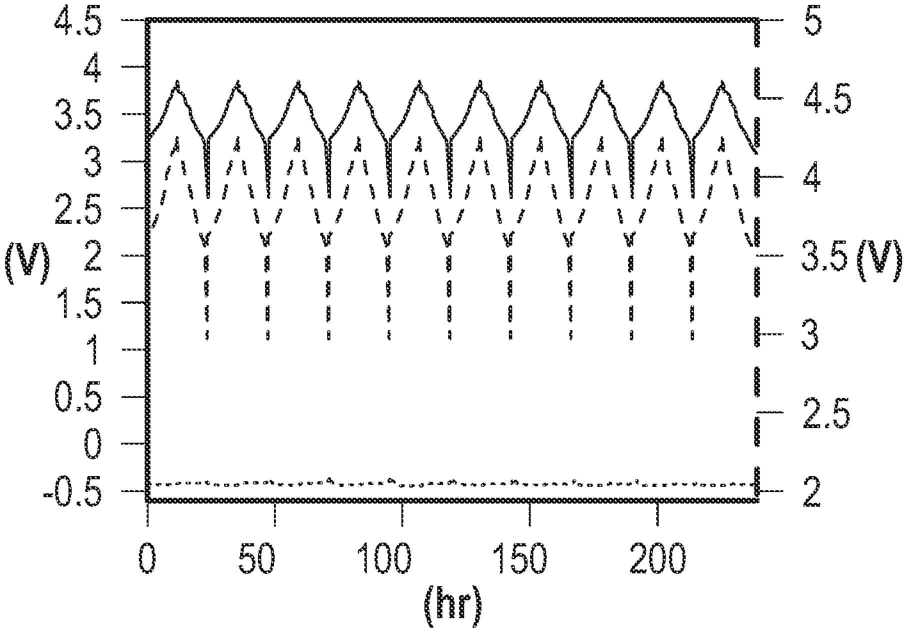
FIG. 4 is a graph of potential (V) versus time (hr) for a lithium aluminum reference electrode according to an aspect.

As shown in FIG. 3, following two C/10 charge-discharge cycles between 3.0 Volts (V) and 4.25 V, the resulting lithium aluminum active material achieved a 400 millivolt (mV) offset versus lithium reference (D), where the working electrode (A), the common electrode (B), and the full cell (C) are shown. The lithium aluminum active material cell is shown as 100 and, for reference, the lithium active material cell is shown as 200. The charge-discharge cycles were repeated at C/10 cycling for an additional eight cycles (ten cycles total), spanning greater than 250 hours. The lithium aluminum active material layer provided the reference electrode with measurement stability for this entire period, as shown in FIG. 4.

Example 2

Figure 5:
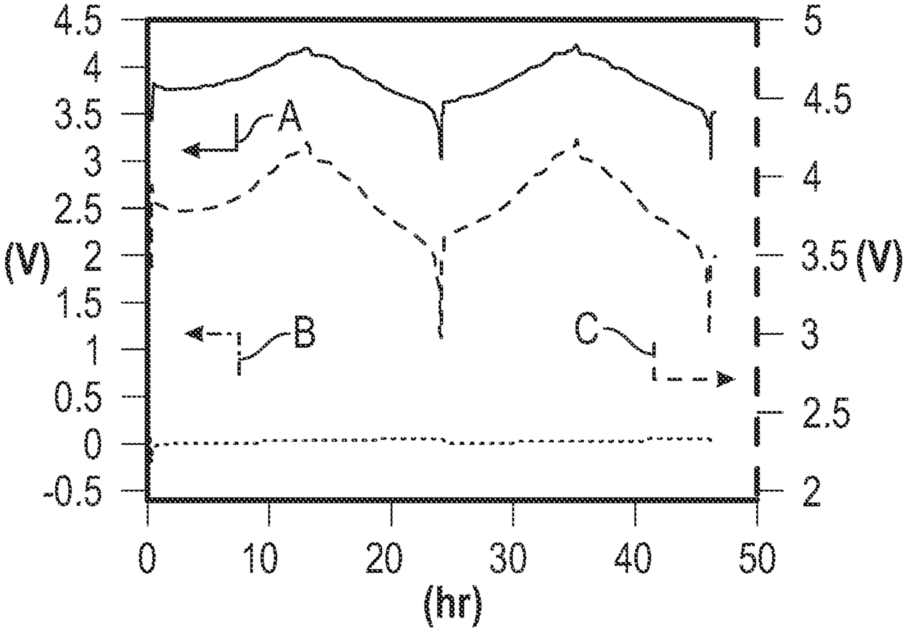
FIG. 5 is a graph of reference electrode potential (V) versus time (hr) for an in-situ plated lithium on copper reference electrode according to an aspect.

An experiment was performed to demonstrate the in-situ formation of a lithium active material layer to form a reference electrode. A three-electrode cell structure was prepared using a lithium anode, a high Ni NCM cathode, a reference electrode, and an electrolyte system including $LiPF_6$, FEC, and DMC. The reference electrode was prepared by in-situ lithium plating of a copper working electrode by constant current discharging of the cell, where the copper working electrode was prepared by DC sputtering of a layer of copper (200 nm) on a ceramic modified separator. As shown in FIG. 5, following two C/10 charge-discharge cycles between 3.0 V and 4.25 V, the resulting lithium active material achieved a 0 mV offset versus lithium, where the working electrode (A), the common electrode (B), and the full cell (C) are shown.

The terms "a" and "an" do not denote a limitation of quantity, but rather denote the presence of at least one of the referenced item. The term "or" means "and/or" unless clearly indicated otherwise by context. Reference throughout the specification to "an aspect," means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of forming a battery cell comprising an anode, a cathode, and a reference electrode, wherein the reference electrode is interposed between the anode and the cathode, and wherein the reference electrode comprises an active material layer disposed on a current collector, the method comprising forming the active material layer on the current collector, wherein the current collector comprises aluminum, and the forming comprises in-situ lithiation to provide an active material layer comprising a lithium aluminum alloy.

2. The method of claim 1, wherein the forming comprises potentiostatic lithiation, galvanostatic lithiation, or electrical shorting of the current collector.

3. The method of claim 1, wherein the active material layer has a thickness of 10 nanometers to 3000 nanometers.

4. The method of claim 1, wherein the current collector has a thickness of 10 nanometers to 1000 nanometers.

5. The method of claim 1, wherein the anode comprises at least one of silicon, silicon mixed with graphite, soft carbon, hard carbon, a silicon oxide ($SiO_x$, $0<x<2$), tin, tin dioxide, or titanium dioxide.

6. A method of forming a battery cell comprising an anode, a cathode, and a reference electrode, wherein the reference electrode is interposed between the anode and the cathode, and wherein the reference electrode comprises an active material layer disposed on a current collector, the method comprising forming the active material layer on the current collector, wherein the current collector comprises copper or nickel, and the forming comprises in-situ lithium plating to provide an active material layer comprising lithium.

7. The method of claim 6, wherein the forming comprises potentiostatic lithiation, galvanostatic lithiation, or electrical shorting of the current collector.

8. The method of claim 6, wherein the active material layer has a thickness of 10 nanometers to 3000 nanometers.

9. The method of claim 6, wherein the current collector has a thickness of 10 nanometers to 1000 nanometers.

10. The method of claim 6, wherein the anode comprises at least one of silicon, silicon mixed with graphite, soft carbon, hard carbon, a silicon oxide ($SiO_x$, $0<x<2$), tin, tin dioxide, or titanium dioxide.

11. A method of forming a battery cell comprising an anode, a cathode, and a reference electrode, wherein the reference electrode is interposed between the anode and the cathode, and wherein the reference electrode comprises an active material layer disposed on a current collector, the method comprising forming the active material layer on the current collector, wherein the forming comprises in-situ formation of an active material layer comprising sodium.

12. The method of claim 11, wherein the current collector comprises copper, nickel, titanium, platinum, gold, silver, magnesium, aluminum, vanadium, an alloy thereof, or a combination thereof.

13. The method of claim 11, wherein the active material layer has a thickness of 10 nanometers to 3000 nanometers.

14. The method of claim 11, wherein the current collector has a thickness of 10 nanometers to 1000 nanometers.

15. The method of claim 11, wherein the anode comprises at least one of silicon, silicon mixed with graphite, soft carbon, hard carbon, a silicon oxide ($SiO_x$, $0<x<2$), tin, tin dioxide, or titanium dioxide.

* * * * *